United States Patent [19]

Drzewiecki et al.

[11] 3,744,303
[45] July 10, 1973

[54] PURE FLUIDIC STRAIN GAGE
[75] Inventors: Tadeusz M. Drzewiecki, Gaithersburg; Francis M. Manion, Rockville, both of Md.
[73] Assignee: The United States of America as represented by the Secretary of the Army, Washington, D.C.
[22] Filed: Nov. 23, 1971
[21] Appl. No.: 201,482

[52] U.S. Cl................ 73/88 R, 73/141 R, 137/830
[51] Int. Cl............................ G01b 5/30, F15c 1/08
[58] Field of Search...................... 73/141 R, 141 A, 73/37 R, 37.5, 37.6, 37.8, 37.9, 88 R; 137/81.5, 830

[56] References Cited
UNITED STATES PATENTS
2,592,569   4/1952   Henderson....................... 73/37.5 X
2,576,221   11/1951  Segerstad.......................... 73/141 A OTHER PUBLICATIONS
Encyclopedic Dictionary of Physics, 1961, pages 202 & 203.

Primary Examiner—Richard C. Queisser
Assistant Examiner—Stephen A. Kreitman
Attorney—Edward J. Kelly

[57] ABSTRACT

A pure fluidic strain gage is disclosed which comprises a conduit or duct constructed of deformable material through which a fluid is caused to flow. The conduit is adapted to receive an external stress and be deformed thereby in a predetermined manner such as by a change in length or the like of the conduit. This deformation produces a change in fluid resistance in the channel and thus effects a variation in the flow characteristics of the fluid through the conduit. A monitoring device, such as a fluidic proportional amplifier, is provided to detect such variations in flow characteristics, these variations being indicative of the value of the external stress received by the conduit and the strain of the conduit.

5 Claims, 4 Drawing Figures

PATENTED JUL 10 1973 3,744,303

INVENTORS
TADEUSZ M. DRZEWIECKI
FRANCIS M. MANION

BY Harry M. Saragovitz
Edward J. Kelly
Herbert Berl
Saul Elbaum

ATTORNEY

PURE FLUIDIC STRAIN GAGE

The invention described herein may be manufactured, used and licensed by or for the United States Government for governmental purposes without the payment to us of any royalty thereon.

BACKGROUND OF THE INVENTION

This invention generally relates to the fluidic arts and particularly concerns pure fluidic strain gages adapted to measure external stresses and strain of a member.

It is oftentimes necessary to control and monitor the amount of external stress or loading to which a structural member of a given mechanical apparatus is subjected. Continued and uncontrolled stresses or loadings may produce undesirable strain of the structural member, fatigue, and ultimate failure.

So as to achieve this stress monitoring, strain gages that monitor a change in dimensions of a given structural member as the member is subjected to loading have been developed. These strain gages of the prior art primarily are electrical in nature, such as piezoelectric and Hall-effect devices and the like adapted to be physically attached to the loaded structural member and to produce changes in electrical characteristics, such as resistance, in proportion to deformation or strain of the loaded structural member as an indication of externally applied stress.

Of course, with electrical strain gages of the type above-described, electrical connections are necessary, along with the associated external wiring and monitoring apparatus. The complexity of such a system renders the typical electrical strain gage expensive to manufacture and maintain, and renders such systems subject to early failure and/or degradation of the accuracy of the monitoring read-out.

SUMMARY OF THE INVENTION

The instant invention represents a departure from prior art strain gages as above-described and has, as its primary objective, the provision of a strain gage which operates in accordance with pure fluidic principles with all the advantages inherent to an all fluidic system as opposed to an electrical system.

It is a further objective of the instant invention to provide a fluidic strain gage which accurately and with high sensitivity monitors external stress applied to a structural element.

A further, more specific, yet equally important objective of the instant invention concerns the provision of a fluidic strain gage which requires no moving parts and which is relatively inexpensive to construct and to maintain.

Yet another objective of the instant invention concerns the provision of a fluidic strain gage of the type above-described which has wide applicability on structural members of varied form.

These objects, as well as others which will become apparent as the description proceeds, are implemented by the instant novel fluidic strain gage which, in a preferred inventive embodiment thereof, will be seen to comprise a conduit means or duct constructed of deformable material through which a fluid, such as air, is caused to flow. The conduit means can, if desired, be embedded in or actually comprise part of a structural member of a mechanical apparatus to which an external stress is applied. When an external stress is received by the conduit means, the conduit means is deformed thereby in a predetermined manner.

For example, if the conduit means comprises a hollow elongated duct of a given length and internal cross-sectional area, an external stress received along the longitudinal axis of the duct is effective to produce a variation in length and cross-sectional area of the duct. This physical variation results in a change of the resistance of the duct to the flow of fluid therethrough.

Alternatively, and in another embodiment of the instant invention, the conduit means to which stress is applied and through which fluid is caused to flow may comprise a hollow tube which exhibits a plurality of bends therein of predetermined radius of curvature throughout a given longitudinal run. Stress received along the longitudinal axis of the tube is effective to bring about a variation in the radius of curvature of the bends in the tube, which variation results in a change of the fluid resistance of the tube.

As yet another alternative embodiment of the instant invention, the conduit means will be seen to comprise a hollow elongated duct having orifices therein of given shape and cross-sectional area communicating with the fluid flow and through which orifices at least a portion of the fluid flow exits. With this embodiment, when external stress is received by the duct, such stress effects a variation in the area of the plurality of orifices, this variation again resulting in a change of fluid resistance of the orifices to the fluid flow in the duct.

Each of the above-mentioned embodiments make use of the principle that a channel member subjected to physical deformation by an external stress will undergo a change in resistance to a fluid flowing therethrough. This change in resistance effects a change in the flow characteristics of the fluid in the conduit, such as a change in the pressure drop across the channel or the conduit, or a change in the volume of fluid flow. Monitoring means are therefore provided by the instant invention so as to detect these variations in flow characteristics of fluid through the conduit, which variations, as above-described, are effected by the conduit deformation and are thus indicative of the value of external stress applied to and received by the conduit.

Many different monitoring means for achieving the above function can be utilized within the scope of the instant invention. In one preferred inventive embodiment particularly adapted for utilization with a conduit which comprises a hollow elongated duct having orifices therein, the monitoring means of the instant invention is contemplated to include a fluid amplifier means which has control inputs that communicate with the orifices and which have receiver outputs for generating a fluid output signal in accordance with and in dependence upon the fluid signal applied to the control inputs through the orifices. The fluid amplifier means could, for example, comprise a fluid proportional amplifier, the output fluid signal of which would depend upon changes in the shape and area of the orifices and thus the physical deformation of the duct to thereby be indicative of the value of external stress applied.

BRIEF DESCRIPTION OF THE DRAWINGS

The invention itself will be better understood and further advantageous features thereof will become evident from the following detailed description of preferred inventive embodiments, such description referring to the appended single sheet of drawings, wherein.

DETAILED DESCRIPTION OF PREFERRED INVENTIVE EMBODIMENTS

Figure 1:
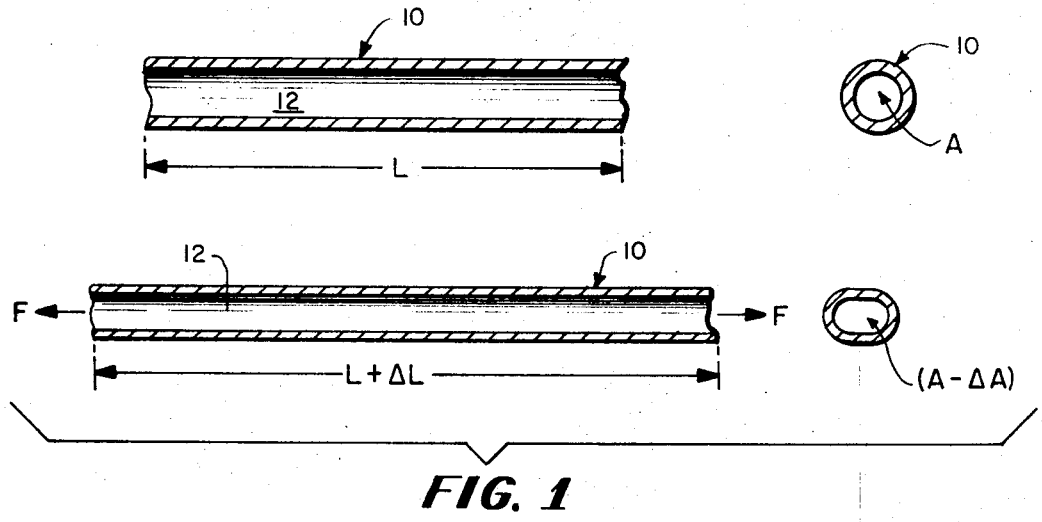
FIG. 1 is a sectional illustration of an elongated cylindrical tube depicting the change in length and internal cross-sectional area thereof in response to the application of an external stress.

Referring now to FIG. 1 of the appended drawings, a conduit means generally designated by reference numeral 10 is disclosed, the conduit means being constructed of a deformable material such as steel or the like, the material being such as to undergo an elastic strain upon the application of an external stress. In this particular embodiment, the conduit means 10 is contemplated to comprise a hollow elongated duct of a given length L and a given internal cross-sectional area A and a fluid, such as air or the like, is caused to flow within the interior of the duct, i.e., within the region 12.

Upon application of an external stress F to the duct 10, such as along the longitudinal axis thereof, as depicted in the lower half of FIG. 1, the duct 10 will deform and, in this instance, will be seen to undergo a change in length. Specifically, if the external stress F applied to the duct 10 is a tensile force as shown, the duct 10 will undergo a positive change in length $\Delta L$ and, associated with such an elongation, the internal cross-sectional area A of the stressed duct will undergo a decrease $\Delta A$. As should be apparent, the physical deformation of the duct 10 upon the aplication of an external stress thereto produces a change in fluid resistance within the region 12 of the duct wherein fluid is flowing, this change in fluid resistance giving rise to a change in pressure drop of the flowing fluid across the elongated duct.

It has been found that, for a relatively long circular conduit or duct 10, the ratio of the percent change in pressure drop to the present change in length of the duct is substantially equal to 1+4E, where E is the duct material Poissons ratio. Accordingly, any variations in flow characteristics of the fluid through the duct such as would be caused by the increased fluidic resistance effected by the duct or conduit deformation would be directly indicative of the value of the external stress F received by the duct. In this fashion, a pure fluidic strain gage can be created so as to measure the strain of a given structural member wherein the strain is defined as the percent change in length of the member. This pure fluidic strain gage operates on the same principle as does the electrical strain gages above-discussed at the outset of this specification in that a change in length produces a change in fluid resistance in a channel or conduit having fluid flowing through it, giving rise to a change in pressure drop across the channel and a change in the amount of fluid flowing therethrough.

Figure 2:
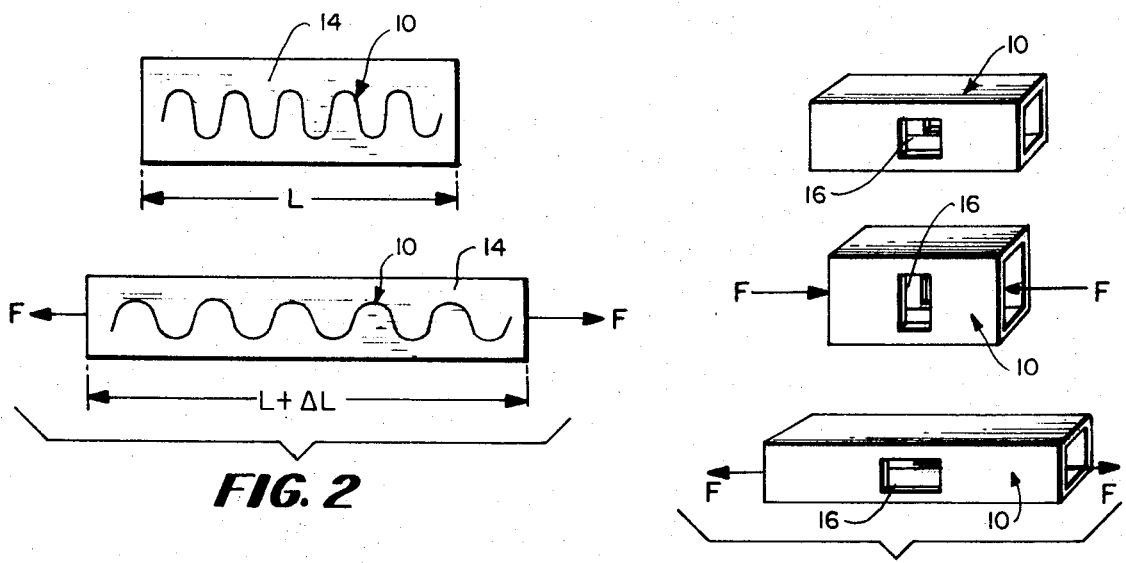
FIG. 2 is a graphical illustration of an element containing a hollow tube which exhibits a plurality of bends therein throughout a given longitudinal run, this Figure depicting the change in radius of curvature of a tube bend as a function of the application of external stress.

This principle of utilizing the change in fluid resistance in a conduit which receives an external stress can be directly applied to different embodiments and configurations of the conduit means. In this respect, attention is now directed to FIG. 2 of the appended sheet of drawings. The conduit means 10 schematically illustrated as being disposed in a structural element 14 is contemplated to comprise a hollow tube which exhibits a plurality of bends therein of predetermined radius of curvature throughout a given longitudinal run L of the tube. When an external stress F is received along the longitudinal axis of the tube, a variation in the radius of curvature of the bends is effected such as is depicted in the lower half of FIG. 2 wherein the external stress is a tensile force. A variation in the radius of curvature of bends in a fluid conducting tube results in a change of the fluid resistance of the tube and, as in the case described with respect to FIG. 1, alters the flow characteristics of the fluid in a manner directly related to the value of the applied or received external stress F. With the embodiment of FIG. 2 and considering that a relatively large number of bends are exhibited by the tube, the ratio of the percent change in pressure drop of the fluid within the tube to the percent change in length of the run of the tube has been found to be ¼.

Figure 3:
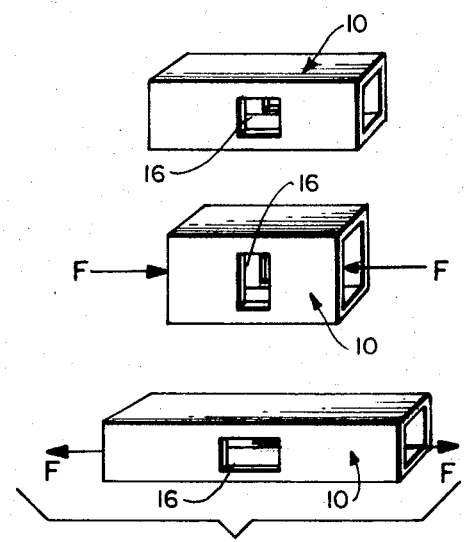
FIG. 3 is a perspective illustration depicting the change in shape and area of orifices in a hollow structural element in response to the application of external stress.

A further embodiment exhibiting the same novel principle of the instant invention is illustrated in FIG. 3 of the appended sheet of drawings wherein the conduit means 10 comprises a hollow elongated duct through which fluid is caused to flow with the duct having orifices, such as orifice 16 thereof of a given shape and cross-sectional area which communicates with the fluid flow and through which orifices at least a portion of the fluid flow in the duct is allowed to exit. Upon application of an external stress F to the elongated duct, a variation in the area as well as shape of the orifices 16 takes place. For example, a tensile external stress is depicted as being received by the duct 10 in the lower illustration of FIG. 3, and a compressive force or external stress F is seen to be applied to the duct 10 in the center illustration of FIG. 3.

In any event, a variation in the area of the orifices 16 results in a change of the fluid resistance of the orifices through which, as above-mentioned, at least a portion of the fluid flow within the elongated duct 10 exits.

For each of the above-described embodiments of the conduit means, the instant invention contemplates the provision of a monitoring means which detects the variations in flow characteristics of the fluid through the conduit means, these variations being effected by the conduit deformation as above-discussed and thus being indicative of the value of the external stress received by the conduit means and the strain of the conduit means.

Figure 4:
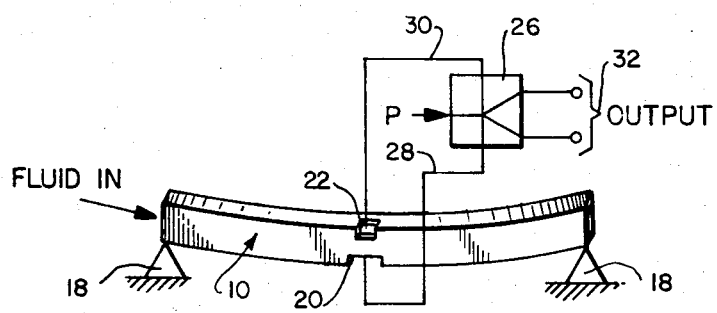
FIG. 4 is a schematic illustration of a monitoring means to monitor the change in resistance associated with variations in shape and area of orifices in a structural member under stress.

In this respect, and as an example of a suitable monitoring means, attention is now directed to FIG. 4 of the appended drawings, the monitoring means therein disclosed being typical of contemplated for use with a conduit having orifices therein such as dipicted in FIG. 3.

The conduit means 10 of FIG. 3 will be seen to comprise a hollow elongated duct 10 disposed on supports 18 to either end thereof and loaded by a downwardly directed force applied near the center of the duct 10 and perpendicular to the longitudinal axis thereof. The conduit means 10 thus comprises a flexed structural member, for example, the flexure or deformation of the member being effected by the application of external stress as described.

An orifice 20 is disposed in the duct or conduit means 10 near the bottom surface thereof, which surface, due to the illustrated physical configuration of the conduit means 10, is under tension. An additional orifice 22 is provided in the duct or conduit means 10 at or near the upper surface thereof, which upper surface is under compression. Initially, i.e., when the conduit means 10 is not under external stress, the shape and cross-sectional areas of each of the orifices 20 and 22 are identical and, for purposes of description, can be construed to be that depicted in the upper illustration of FIG. 3. When the conduit means 10 is loaded as shown, the orifice 20 changes its shape and cross-sectional area as depicted in the lower illustration of FIG. 3, whereas orifice 22 changes its shape and cross-sectional area in the fashion suggested by the center illustration of FIG. 3.

A fluidic amplifier means, such as a fluidic proportional amplifier 26 can function as the monitoring means above-described, the fluid amplifier means 26 having control inputs 28 and 30 communicating with the orifices 20 and 22, respectively, and a plurality of receiver outputs 32. An input pressure P is applied in conventional fashion to form the power stream to the fluid amplifier.

With this embodiment, fluid is caused to flow through the conduit means 10 and at least a portion of the fluid flow exits through the various orifices 20 and 22. When the duct or conduit means 10 is under no load, the signal received by control inputs 28 and 30 of the fluid amplifier 26 will be equal and, since fluid amplifier 26 preferably comprises a fluidic proportional amplifier, no output 32 will be present. As the conduit means is subjected to external stress in the manner above-described so as to flex as illustrated in FIG. 4, the size and shape of the orifices 20 and 22 through which at least a portion of the fluid flow exits varies and this variation causes a change in the input signals respectively applied to control inputs 28 and 30 of the fluid amplifier 26. An "unbalance" of such control inputs serves to produce a difference signal between the outputs 32 of the amplifier 26. This output signal is indicative of the value of external stress applied to the conduit means 10, and the strain of the conduit means itself. With proper design, the output signal may be obtained by variations in either pressure or flow of the fluid through the conduit means 10 and thus increase the versatility of the invention and its application to specific environments and in specific structural members.

As should now be apparent, the objectives set forth at the outset of this specification have been successfully achieved by the provision of the above-described pure fluidic strain gage. It should be understood that the invention is not limited to the exact details of construction shown and described herein, for obvious modifications will occur to persons skilled in the art. Accordingly,

What is claimed is:

1. A fluidic strain gage comprising a conduit means constructed of deformable material through which a fluid is caused to flow, said conduit means being adapted to receive external stress and be deformed thereby in a predetermined manner, said conduit means comprising a hollow elongated duct having at least one lateral orifice therein of a given shape and cross-sectional area communicating with the fluid flow and through which orifice at least a portion of the fluid flow exits and monitoring means for detecting variations and flow characteristics of the fluid through said orifice, said variations being effected by the conduit deformation and thus being indicative of the value of external stress received by said conduit means and the strain of said conduit means.

2. A fluidic strain gage as defined in claim 1, wherein said conduit means comprises a hollow elongated duct of given length and internal cross-sectional area, and wherein at least a portion of the external stress is received along the longitudinal axis of the said duct whereby a variation in the length and cross-sectional area of said orifice is effected, said variation resulting in a change of the fluid resistance of said orifice.

3. A fluidic strain gage comprising a conduit means constructed of deformable material through which a fluid is caused to flow, said conduit means being adapted to receive external stress and be deformed thereby in a predetermined manner; and monitoring means detecting variations in flow characteristics of the fluid through said conduit means, said variations being effected by the conduit deformation and thus being indicative of the value of external stress received by said conduit means, wherein said conduit means comprises a hollow tube exhibiting a plurality of bends therein of predetermined radius of curvature throughout a given longitudinal run of said tube, and wherein at least a portion of the external stress is received along the longitudinal axis of said tube, whereby a variation in the radius of curvature of said bends is effected, said variation resulting in a change of the fluid resistance of said tube.

4. A fluidic strain gage as defined in claim 1 wherein said conduit means has a plurality of lateral orifices formed therein and the external stress received by said duct effects a variation in the area of said orifices, said variation resulting in a change of the fluid resistance of said orifices.

5. A fluidic strain gage as defined in claim 4, wherein said monitoring means comprises a fluid amplifier means having control inputs communicating with said orifices, and having receiver outputs for generating a fluid output signal in dependence upon the fluid signal applied to said control inputs through said orifices.

* * * * *